United States Patent
Jones et al.

(10) Patent No.: US 12,519,863 B2
(45) Date of Patent: *Jan. 6, 2026

(54) SYSTEMS AND METHODS FOR ATTACHABLE-AND-DETACHABLE DATABASE SESSIONS

(71) Applicant: Snowflake Inc., Bozeman, MT (US)

(72) Inventors: Tyler Jones, Redwood City, CA (US); Peter Povinec, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/522,182

(22) Filed: Nov. 28, 2023

(65) Prior Publication Data

US 2024/0095217 A1  Mar. 21, 2024

Related U.S. Application Data

(63) Continuation of application No. 18/148,863, filed on Dec. 30, 2022, now Pat. No. 11,868,317, which is a (Continued)

(51) Int. Cl.
*H04L 67/306* (2022.01)
*G06F 16/14* (2019.01)
(Continued)

(52) U.S. Cl.
CPC .......... *H04L 67/306* (2013.01); *G06F 16/144* (2019.01); *G06F 16/156* (2019.01);
(Continued)

(58) Field of Classification Search
CPC ......... H04L 67/01; H04L 67/02; H04L 67/14; H04L 67/306; G06F 16/144; G06F 16/156; G06F 16/1865; G06F 16/1734
See application file for complete search history.

(56) References Cited

U.S. PATENT DOCUMENTS 6,678,791 B1  1/2004  Jacobs et al.
7,962,644 B1  6/2011  Ezerzer et al.
(Continued)

FOREIGN PATENT DOCUMENTS

CN  116157788  5/2023
DE  202021004266  5/2023
WO  2022016169  1/2022

OTHER PUBLICATIONS

"European Application Serial No. 21842543.7, Extended European Search Report mailed Jul. 2, 2024", 6 pages.
(Continued)

*Primary Examiner* — Tarek Chbouki
(74) *Attorney, Agent, or Firm* — Schwegman Lundberg & Woessner, P.A.

(57) ABSTRACT

In an embodiment, a database platform maintains a first account and a second account, where the second account has stored therein an attachable-and-detachable database session. The database platform receives, from a second-account user in the second account, a request to grant, to a first-account user in the first account, access to the attachable-and-detachable database session, and responsively grants the requested access. The database platform receives, from the first-account user, an attachment request requesting that the first-account user attach to the attachable-and-detachable database session, and responsively sets the attachable-and-detachable database session as a current database session for the first-account user. The database platform executes at least one command received from the first-account user with respect to the attachable-and-detachable database session.

20 Claims, 3 Drawing Sheets

Related U.S. Application Data continuation of application No. 17/657,401, filed on Mar. 31, 2022, now Pat. No. 11,544,224, which is a continuation of application No. 17/219,860, filed on Mar. 31, 2021, now Pat. No. 11,321,279, which is a continuation of application No. 16/931,779, filed on Jul. 17, 2020, now Pat. No. 10,997,121.

(51) Int. Cl.
    *G06F 16/17*     (2019.01)
    *G06F 16/18*     (2019.01)
    *H04L 67/14*     (2022.01)
    *H04L 67/02*     (2022.01)
    *H04L 67/1097*   (2022.01)

(52) U.S. Cl.
    CPC ...... *G06F 16/1734* (2019.01); *G06F 16/1865* (2019.01); *H04L 67/14* (2013.01); *H04L 67/02* (2013.01); *H04L 67/1097* (2013.01)

(56) References Cited

U.S. PATENT DOCUMENTS

| | | |
|---|---|---|
| 9,247,059 B1 | 1/2016 | Chidambaram |
| 9,877,188 B1 | 1/2018 | Jain |
| 10,348,821 B2 | 7/2019 | Hunter et al. |
| 10,885,525 B1 | 1/2021 | Sharafi |
| 10,997,121 B1 | 5/2021 | Jones et al. |
| 11,321,279 B2 | 5/2022 | Jones et al. |
| 11,481,837 B1 | 10/2022 | Brandt et al. |
| 11,544,224 B2 | 1/2023 | Jones et al. |
| 11,868,317 B2 | 1/2024 | Jones et al. |
| 2002/0062347 A1 | 5/2002 | Low et al. |
| 2003/0046589 A1 | 3/2003 | Gregg |
| 2004/0034670 A1 | 2/2004 | Bhuyan |
| 2004/0128388 A1 | 7/2004 | Kaiser |
| 2005/0010572 A1 | 1/2005 | Clark et al. |
| 2005/0086126 A1 | 4/2005 | Patterson |
| 2006/0117021 A1 | 6/2006 | Sidney et al. |
| 2006/0248350 A1 | 11/2006 | Stanev |
| 2007/0162574 A1 | 7/2007 | Williamson et al. |
| 2007/0294209 A1 | 12/2007 | Strub et al. |
| 2011/0231419 A1 | 9/2011 | Papke et al. |
| 2011/0247045 A1 | 10/2011 | Rajagopal et al. |
| 2013/0042312 A1 | 2/2013 | Wickman |
| 2013/0066837 A1 | 3/2013 | Colrain et al. |
| 2013/0203410 A1 | 8/2013 | Gandhi et al. |
| 2013/0339533 A1 | 12/2013 | Neerincx et al. |
| 2013/0340028 A1 | 12/2013 | Rajagopal et al. |
| 2014/0280939 A1 | 9/2014 | Banatwala et al. |
| 2015/0324259 A1 | 11/2015 | Bastawala et al. |
| 2017/0180486 A1 | 6/2017 | Mehta et al. |
| 2017/0295209 A1 | 10/2017 | Menezes et al. |
| 2018/0196955 A1 | 7/2018 | Dageville et al. |
| 2019/0096180 A1* | 3/2019 | Petersen ............ G07F 17/3241 |
| 2019/0322439 A1 | 10/2019 | Leung |
| 2020/0092381 A1 | 3/2020 | Morgan |
| 2022/0019557 A1 | 1/2022 | Jones et al. |
| 2022/0222217 A1 | 7/2022 | Jones et al. |
| 2023/0141317 A1 | 5/2023 | Jones et al. |

OTHER PUBLICATIONS

"U.S. Appl. No. 16/931,779, Non Final Office Action mailed Sep. 11, 2020", 10 pgs.
"U.S. Appl. No. 16/931,779, Response filed Dec. 11, 2020 to Non Final Office Action mailed Sep. 11, 2020", 17 pgs.
"U.S. Appl. No. 16/931,779, Examiner Interview Summary mailed Dec. 14, 2020", 3 pgs.
"U.S. Appl. No. 16/931,779, Notice of Allowance mailed Jan. 21, 2021", 8 pgs.
"U.S. Appl. No. 17/219,860, Non Final Office Action mailed Jun. 8, 2021", 10 pgs.
"International Application Serial No. PCT US2021 070790, International Search Report mailed Jul. 29, 2021", 2 pgs.
"International Application Serial No. PCT US2021 070790, Written Opinion mailed Jul. 29, 2021", 5 pgs.
"U.S. Appl. No. 17/219,860, Response filed Sep. 8, 2021 to Non Final Office Action mailed Jun. 8, 2021", 13 pgs.
"U.S. Appl. No. 17/219,860, Final Office Action mailed Sep. 27, 2021", 12 pgs.
"U.S. Appl. No. 17/219,860, Response filed Jan. 27, 2022 to Final Office Action mailed Sep. 27, 2021", 14 pgs.
"U.S. Appl. No. 17/219,860, Notice of Allowance mailed Feb. 23, 2022", 8 pgs.
"U.S. Appl. No. 17/657,401, Non Final Office Action mailed May 24, 2022", 12 pgs.
"U.S. Appl. No. 17/657,401, Response filed Aug. 24, 2022 to Non Final Office Action mailed May 24, 2022", 15 pgs.
"U.S. Appl. No. 17/657,401, Notice of Allowance mailed Sep. 23, 2022", 8 pgs.
"U.S. Appl. No. 17/657,401, Corrected Notice of Allowability mailed Oct. 13, 2022", 5 pgs.
"International Application Serial No. PCT US2021 070790, International Preliminary Report on Patentability mailed Jan. 26, 2023", 7 pgs.
"U.S. Appl. No. 18/148,863, Non Final Office Action mailed May 4, 2023", 10 pgs.
"U.S. Appl. No. 18/148,863, Response filed Jul. 19, 2023 to Non Final Office Action mailed May 4, 2023", 10 pgs.
"U.S. Appl. No. 18/148,863, Examiner Interview Summary mailed Jul. 21, 2023", 2 pgs.
"U.S. Appl. No. 18/148,863, Notice of Allowance mailed Sep. 7, 2023", 8 pgs.
"European Application Serial No. 21842543.7, Response to Communication Pursuant to Rules 161 and 162 EPC filed Aug. 31, 2023", 4 pgs.
"U.S. Appl. No. 18/148,863, Corrected Notice of Allowability mailed Sep. 20, 2023", 5 pgs.
U.S. Appl. No. 16/931,779 U.S. Pat. No. 10,997,121, filed Jul. 17, 2020, Attachable-and-Detachable Database Sessions.
U.S. Appl. No. 17/219,860 U.S. Pat. No. 11,321,279, filed Mar. 31, 2021, Attachable-and-Detachable Database Sessions.
U.S. Appl. No. 18/148,863 U.S. Pat. No. 11,868,317, filed Dec. 30, 2022, Attachable-and-Detachable Database Sessions.
U.S. Appl. No. 17/657,401 U.S. Pat. No. 11,544,224, filed Mar. 31, 2022, Attachable-and-Detachable Database Sessions.

\* cited by examiner

SYSTEMS AND METHODS FOR ATTACHABLE-AND-DETACHABLE DATABASE SESSIONS

CROSS-REFERENCE TO RELATED APPLICATIONS

This application is a Continuation of U.S. patent application Ser. No. 18/148,863 filed Dec. 30, 2022, which is a Continuation of U.S. patent application Ser. No. 17/657,401 filed Mar. 31, 2022 and now issued as U.S. Pat. No. 11,544,224, which is a Continuation of U.S. patent application Ser. No. 17/219,860, filed Mar. 31, 2021 and now issued as U.S. Pat. No. 11,321,279, which is a Continuation of U.S. patent application Ser. No. 16/931,779 filed Jul. 17, 2020 and now issued as U.S. Pat. No. 10,997,121, the contents of which are incorporated by reference in their entireties.

TECHNICAL FIELD

The present disclosure relates to database platforms and, more particularly, to systems and methods for attachable-and-detachable database sessions.

BACKGROUND

Database platforms are widely used for data storage and data access in computing and communication contexts, With respect to architecture, a database platform could be an on-premises database platform, a network-based database platform (e.g., a cloud-based database platform), a combination of the two, and/or include another type of architecture. With respect to type of data processing, a database platform could implement online transactional processing (OLTP), online analytical processing (OLAP), a combination of the two, and/or another type of data processing. Moreover, a database platform could be or include a relational database management system (RDBMS) and/or one or more other types of database management systems.

In a typical implementation, a database platform includes one or more databases that are maintained on behalf of a customer account. Indeed, the database platform may include one or more databases that are respectively maintained in association with any number of customer accounts, as well as one or more databases associated with a system account (e.g., an administrative account) of the database platform, one or more other databases used for administrative purposes, and/or one or more other databases that are maintained in association with one or more other organizations and/or for any other purposes. A database platform may also store metadata in association with the database platform in general and in association with particular databases and/or particular customer accounts as well. Users and/or executing processes that are associated with a given customer account may, via one or more types of clients, be able to cause data to be ingested into one or more databases (including, e.g., one or more tables), and may also be able to manipulate (e.g., modify) the data, add additional data, remove data, run queries against the data, and so forth.

In an implementation of a database platform, a given database (e.g., a database maintained for a customer account) may reside as a database object within, e.g., a customer account, which may include other objects (e.g., users, roles, and/or the like) as well. Furthermore, a given database object may itself contain one or more objects such as schemas, tables, materialized views, and/or the like. A given table may be organized as a collection of records (e.g., rows) that each include a plurality of attributes (e.g., columns). In many implementations, database data is physically stored in multiple storage units, which may be referred to as files, blocks, micro-partitions, and/or by one or more other names. In many cases, one or more databases on a database platform serve as a backend for one or more applications that are executing on one or more application servers.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

As stated above, it often occurs that clients carry out various transactions (e.g., data ingestion, data insertion, data modification, data deletion, and/or the like) with respect to one or more databases in, e.g., a customer account on a database platform. Among other examples, a given client could be or include a web interface, a mobile app, a desktop application, a Java Database Connectivity (JDBC) driver (that may be operated by or in conjunction with, e.g., an application), a remote function (e.g., an AMAZON WEB SERVICES™ (AWS™) LAMBDA™ function, a MICROSOFT® AZURE AUTOMATION™ function, or the like) that may carry out one or more JDBC calls, an Open Database Connectivity (ODBC) driver (that may be operated by or in conjunction with, e.g., an application), and/or the like.

In some database-platform implementations, each time a client establishes a connection with a database platform, the database platform establishes a database session (that is maintained on the server side (i.e., on the network side)) on behalf of the client and in a one-to-one association with that particular connection, which may be or include a HyperText Transfer Protocol (HTTP) connection (e.g., an HTTP REpresentational State Transfer (REST) connection), a Transport Control Protocol/Internet Protocol (TCP/IP) connection, and/or the like. This connection may be a logical connection over which a client sends requests at various times and over which the database platform responds to those requests at various times, without the need to maintain what is known in the art as a persistent connection (e.g., a persistent physical connection).

In some implementations, as part of establishing a connection, a client undergoes or participates in what is known as a 2-legged or 3-legged authentication (e.g., OAuth) process that results in the database platform issuing the client what is known as a session token (e.g., a long pseudorandom alphanumeric identifier) for the client to use during the associated database session. In some cases, at one or more times (e.g., periodically) during the session, the database platform may renew a session token by, e.g., sending a replacement session token for the client to thereafter use during the session. In such embodiments, references herein to "the session token," "the issued session token," and the like refer to the currently valid session token.

Typically, the client (e.g., a JDBC driver) maintains session tokens in memory (e.g., the random access memory (RAM)) on the system (or device, etc.) on which the client is executing. In many implementations, for security considerations and/or for other reasons, session tokens are not persisted on client-side systems i.e., in many implementations, session tokens are not stored on the client side in data storage other than RAM.

When the client issues queries and/or one or more other types of communications (e.g., structured query language (SQL) commands such as data definition language (DDL) commands, data query language (DQL) commands, data manipulation language (DML) commands, data control language (DCL) commands, and/or the like) to a database platform during the database session, the client typically embeds the issued session token in such queries and/or other communications, in order to identify the correct session to the database platform, which maintains current state of the database session on the server side, including maintaining session state related to, e.g., ongoing transactions, session parameters, session variables, query history, environment, context, and/or the like.

During the established database session, the client may issue one or more statements (also referred to as commands), where each such statement instructs the database platform to carry out a function such as inserting data into one or more tables, modifying data in one or more tables, deleting data from one or more tables, and/or the like. Sometimes, more than one of these statements are performed in a sequence as part of what is known as a multi-statement transaction. After all of the statements in the multi-statement transaction are completed, the client may issue a commit instruction with respect to the multi-statement transaction, which finalizes the multi-statement transaction and releases any locks that may have been placed on one or more tables, databases, and/or the like during the execution of the multi-statement transaction. It is noted that these locks are computationally expensive and can affect concurrent transactions.

Thus, from the perspective of the database platform, in at least one embodiment, each connection that is established with the database platform by a client gets assigned its own database session with a set of one or more session tokens that is unique to that session. (The client may also be assigned an access token and/or one or more other values as well.) It can occur for various reasons, however, that a connection is lost or otherwise becomes inaccessible on the client side even though the connection and the associated database session are still being maintained on the server side by the database platform. This can occur if, for example, the client and/or its host system crashes and needs to be rebooted—in such an instance, the session token that had been being maintained in the RAM of the client-side system is typically lost amid the crash-and-reboot sequence, rendering the associated database session practically inaccessible from the client side. Another possibility that can occur is a breakdown (e.g., an Internet outage) somewhere between the client-side system and the database platform—in that event, even though the session token may still be properly stored in the RAM of the client-side system, the connection (e.g., the HTTP REST connection) may time out on the database platform due to a lack of activity (i.e., queries and/or the like) from the client.

In either case, or due to one or more events other than the provided examples (e.g., a power outage at the location of the client-side system), the server-side database session may have effectively been "orphaned" or "marooned" on the database platform, in some cases placing an associated database in an unstable intermediate state due to the execution of, e.g., one or more but less than all of the statements in a multi-statement transaction. This situation is unstable and inconvenient (e.g., a great deal of client work may be lost, one or more table locks may prevent progress being made by other transactions, etc.), and often must be manually corrected by, e.g, an administrator of the database undoing the execution of one or more statements, deleting data and/or performing one or more other cleanup tasks, removing locks from one or more tables, and/or the like. Occurrences of orphaned server-side sessions are becoming more and more common due to database platforms, applications, clients, and the like becoming more and more geographically distributed, and this trend is only expected to continue. Another cause of orphaned server-side sessions, and a trend that is also expected to continue, is simply increased activity on database platforms, as more usage naturally leads to more occurrences of many events including the orphaning of server-side sessions.

To address these and other shortcomings of prior implementations, disclosed herein are various embodiments of systems and methods for attachable-and-detachable database sessions. In at least one embodiment, a database platform provides clients with an option to create a type of database session from which the client can detach and to which the client can later reattach, after which the client can continue its work. This type of database session is referred to herein as an attachable-and-detachable (AAD) database session. Indeed, whether a client chooses to detach from an AAD database session—also referred to herein as an AAD session—or is involuntarily detached by virtue of a system crash, power outage, Internet-connectivity issue, and/or one or more other causes, the client can, in accordance with embodiments of the present disclosure, reattach to the AAD session and continue its work (e.g., continue from where it left off).

In various different embodiments, the same client or a different client can (re)attach to the AAD session and resume working from the same or a different client-side system. Moreover, as explained below, in various different embodiments, AAD sessions can be shown (i.e, listed), audited, cloned, and/or dropped, among other example functions that can be implemented. In at least one embodiment, a database platform establishes a database session on behalf of a client as a matter of course each time the client establishes a new connection with the database platform, and the client can then create or attach to an AAD session from that initial, automatically established database session. That type of automatically established database session is referred to in this disclosure at times as "a normal database session," "a regular database session," "a conventional database session," and/or the like.

Unlike some existing implementations that involve complicated client-server protocols that revolve largely around failure scenarios and that involve clients trying to reconnect to a conventional database session, embodiments of the present disclosure place users, applications, processes, other operators of clients, and the like in control, and provide them with the ability to make attachability and detachability an explicit, overt feature of the database sessions of their choice. Indeed, in connection with embodiments of the present disclosure, clients can come and go from AAD sessions at will, and return to AAD sessions in the event of being involuntarily detached. Moreover, embodiments of the present disclosure provide this attachability-and-detachability functionality without asking clients to receive and maintain session state, session identifiers, session tokens, and/or the like.

Moreover, and as a corollary advantage of the above-listed advantages, AAD sessions in accordance with embodiments of the present disclosure can be used from multiple different clients at, e.g., different times. If a first client fails, times out, expires, and/or the like, a second client can attach to the AAD session and continue the work of the first client. And this of course translates to any number of different clients, not just two. Among other contexts, this capability is advantageous in the context of remote-function invocations such as AWS LAMBDA™ function invocations, which typically have a limited time duration (e.g., 15 minutes). Moreover, it is quite common for a first invocation and a second invocation of the same remote function (e.g., AWS LAMBDA™ function) to execute back-to-back on different underlying machines, a possibility that is seamlessly handled by embodiments of the present disclosure.

In accordance with embodiments of the present disclosure, second and subsequent clients (or, e.g., a first (or subsequent) client returning to continue work after a second (or other) client has attached and then detached) do not need to set up the session, repeat the setting of session parameters, recreate session variables, replay queries and/or other commands, and/or the like. Clients can simply attach and get to work. Moreover, it is often the case that repeating the setting of all session parameters (e.g., auto-commit behavior, query tags, time zones, certain feature behaviors, and/or the like) would be a near-impossible task due to the myriad sources from which various different database-session parameters are set, inferred, inherited, and/or the like. Additionally, in accordance with embodiments of the present disclosure, AAD sessions can quite easily be cloned and/or otherwise configured the same way for multiple instances. Cloning can be convenient for debugging purposes, among other advantages.

Moreover, as discussed more fully below, in accordance with embodiments of the present disclosure, AAD sessions can be shared across multiple customer accounts. In an example scenario, a user in a first customer account on a database platform wishes to share some data with a user in a second customer account on the database platform. Upon setting up a share of that data with the user in the second customer account, it may come to the attention of the user in the first customer account that the user in the second customer account does not have visibility of all of the data that the user in the first customer account intended the user in the second customer account to have. The user in the second customer account may create an AAD session and share that AAD session with the user in the first customer account. For example, the user in the second customer account may grant a usage privilege on the AAD session to the user in the first customer account. The user in the first customer account may then attach to the AAD session in accordance with embodiments of the present disclosure and troubleshoot the issue from the perspective of the user in the second customer account. The user in the first customer account may be able to resolve the data-sharing issue and then leave the AAD session, at which point the user in the second customer account may drop both the AAD session and the sharing of that session. Alternatively, the user in the second customer account could attach to that AAD session. It is noted that embodiments of the present disclosure make these options possible without any credentials having to be shared among users in the different customer accounts on the database platform.

Moreover, embodiments of the present disclosure enable so-called "super users" (e.g., admins) and/or other users to configure AAD sessions to their liking and then assign the configured AAD sessions to other users for processing. In one example scenario, an administrative user prepares a session for another user for a particular workload. The administrative user may create an AAD session in accordance with embodiments of the present disclosure, and then alter that created AAD session by setting certain session parameters and/or session variables according to the administrative user's preferences for the session. The administrative user may then grant a usage privilege on the created AAD session to the other user, who may then attach to that AAD session and interact with the AAD session in the manner designed by the administrative user. Other similar workflows are possible and will occur to those of skill in the art having the benefit of the present disclosure.

As another advantage of embodiments of the present disclosure, unlike current implementations in which clients lose their sessions unless they interact with the sessions at the database platform at some minimum frequency to avoid time outs, AAD sessions in accordance with embodiments of the present disclosure can remain inactive for longer than such timeout periods and still be available for clients to reattach and resume work. This longevity of AAD sessions also enables customers to upgrade, e.g., drivers, connector code, and/or the like to continue using in connection with an existing AAD session. This can be advantageous for long-lived processes such as extract-transform-load (ETL) processes and the like. Another related advantage of embodiments of the present disclosure is that, unlike current implementations in which sessions are terminated in response to re-authentication events, AAD sessions in embodiments of the present disclosure are decoupled from and therefore survive re-authentication events, though of course authentication is still important and is still conducted in connection with embodiments of the present disclosure.

Embodiments of the present disclosure are also advantageous in comparison with existing implementations that involve a database platform serializing a current state of a conventional database session and providing that serialization as a data file (e.g., a zip file) to a client, which can then share that serialized session with other clients that could then work on a similar (though of course not the same) session—the other clients would merely be operating on a copy of the original session, not to mention that this approach is time-consuming and error-prone, among other drawbacks. The serialization approach also raises security concerns, in that attackers could exploit that client-side information.

It is further noted that, in accordance with embodiments of the present disclosure, AAD sessions being implemented in a given database platform are not necessarily a replacement of conventional database sessions. This could be the case but, in some embodiments, the AAD sessions are instead complementary to the conventional database sessions. That is, in accordance with embodiments of the present disclosure, conventional database sessions are implemented alongside AAD sessions in a given database platform.

One example embodiment takes the form of a method that includes receiving, by a database platform having at least one processor, a request from a client for creation of an attachable-and-detachable database session. The method also includes creating, by the database platform responsive to receiving the request, the attachable-and-detachable database session for the client at the database platform. The method also includes setting, by the database platform, the attachable-and-detachable database session as a current database session for the client at the database platform. The method also includes determining, by the database platform, that the client has detached from the attachable-and-detachable database session, and thereafter continuing to maintain the attachable-and-detachable database session in data storage at the database platform.

Another embodiment takes the form of a system (e.g., a database platform) that includes at least one processor, and that also includes one or more computer-storage media containing instructions executable by the at least one processor for causing the at least one processor to perform at least the operations that are listed in the preceding paragraph. Still another embodiment takes the form of one or more computer-storage media containing instructions executable by at least one processor (of, e.g., a database platform) for causing the at least one processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment (e.g., a database-platform embodiment), a computer-storage-media (or medium) embodiment, and/or one or more other types of embodiments. Furthermore, this flexibility and cross-applicability of embodiments is present in spite of any use herein of any slightly different language (e.g., processes, methods, methodologies, steps, operations, functions, and/or the like) to describe and/or characterize such embodiments and/or any element or elements thereof.

Figure 1:
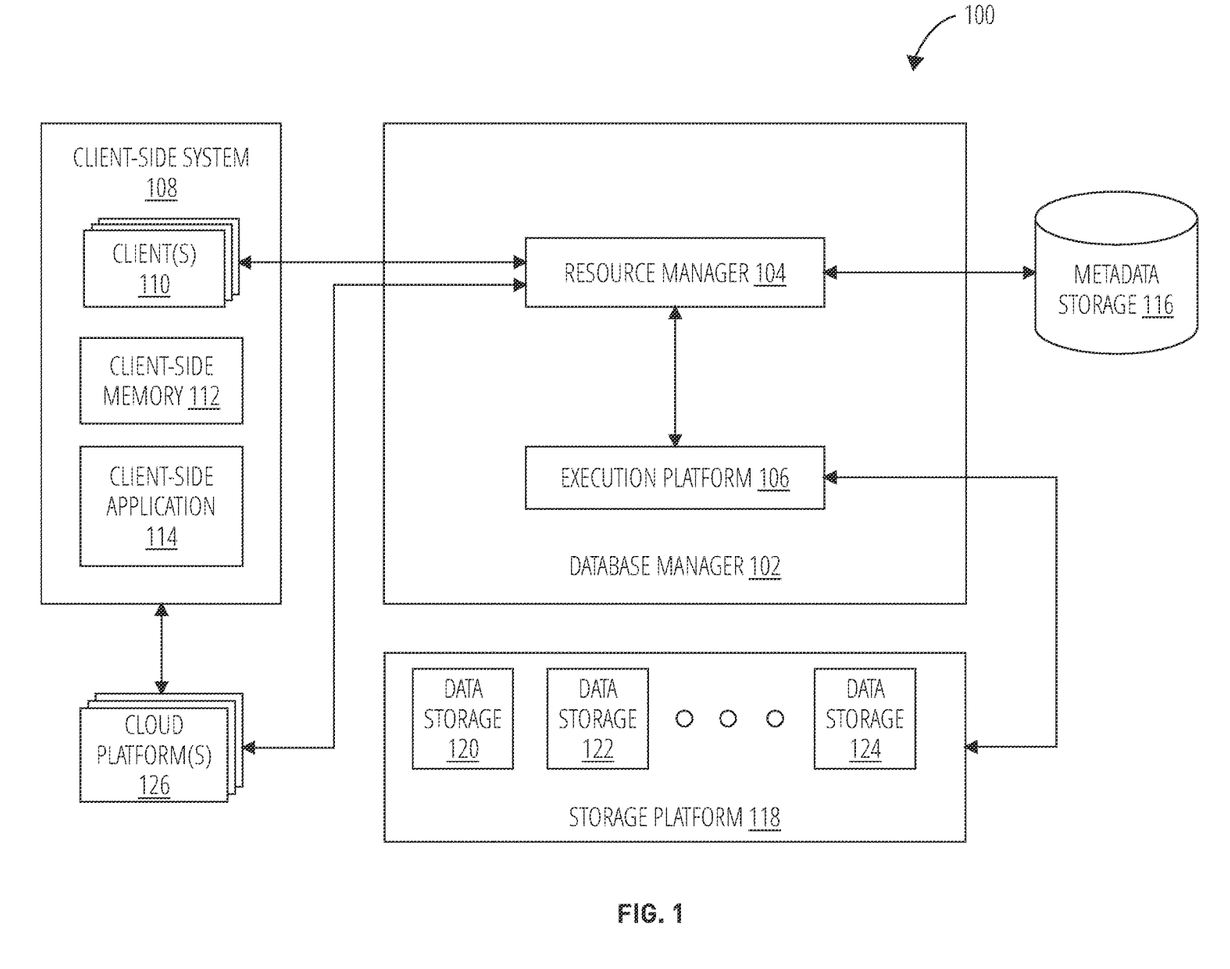
FIG. 1 illustrates an example database platform, in accordance with at least one embodiment.

FIG. 1 illustrates an example database platform 100, in accordance with at least one embodiment. In various embodiments, the database platform 100 may be used for performing one or more of the operations of one or more of the methods disclosed herein. As shown in FIG. 1, the database platform 100 includes a database manager 102, which includes a resource manager 104 and an execution platform 106. The database manager 102 need not be a defined physical device, though it could be, but in general is used herein as shorthand to refer to the combination of the resource manager 104 and the execution platform 106. The execution platform 106 may include one or more execution nodes (e.g., servers, workers, threads, and/or the like). A grouping of execution nodes in the execution platform 106 may be referred to as a virtual warehouse, and such virtual warehouses are, in some embodiments, dynamically resizable to meet changing demands. Also depicted in FIG. 1 are a client-side system 108, a metadata storage 116, a storage platform 118, and one or more cloud platforms 126.

The client-side system 108 is depicted as including one or more clients 110, a client-side memory 112, and a client-side application 114. The client-side system 108 could certainly include other non-depicted components as well, such as one or more user interfaces, for example. In various different embodiments, the client-side system 108 could be WINDOWS® domain, a MAC® domain, a LINUX® domain, a UNIX® domain, and/or the like. Any one or more of the clients 110 could be a JDBC client, an ODBC client, or any other type of client mentioned herein or deemed suitable by those of skill in the art for a given implementation. The client-side memory 112 may be RAM, and the client-side application 114 may be any application, and may present an interactive user interface to a user of the client-side system 108. The client-side application 114 may utilize one or more clients 110 to communicate with the resource manager 104 in accordance with embodiments of the present disclosure. The client-side system 108 may also be in communication with one or more of the cloud platforms 126 to perform tasks such as data storage, data retrieval, remote-function invocation, and/or the like.

In some embodiments, all of the entities that are depicted in FIG. 1 are part of what is referred to herein as the database platform 100, though this is not the case for all embodiments. For example, in at least one embodiment, the database platform 100 does not include the client-side system 108 (or any depicted (or non-depicted) components thereof). As another example, in some embodiments, the database platform 100 does not include any cloud platforms 126. As yet another example, in some embodiments, the database platform 100 does not include the storage platform 118. In the embodiments that are primarily described herein, the database platform 100 includes the database manager 102 (including the resource manager 104 and the execution platform 106), the metadata storage 116, and the storage platform 118, and does not include either the client-side system 108 (or any depicted (or non-depicted) components thereof) or any cloud platforms 126. Other permutations are possible as well.

The resource manager 104 may be configured to manage a number of different types of tasks including external database tasks (e.g., query requests) that are received from, e.g., one or more clients 110. The resource manager 104 may be coupled to any number of clients in any number of client-side systems, though only the client-side system 108 is depicted by way of example in FIG. 1. The clients 110 may facilitate end users making data-storage and/or data-retrieval requests, system administrators managing the database platform 100, and/or the like. The resource manager 104 is also depicted as being communicatively connected with the one or more cloud platforms 126 for carrying out functions such as storing data in a cloud platform 126, retrieving data from a cloud platform 126, invoking and receiving output from external functions executing on a cloud platform 126, and/or the like. As examples, a cloud platform 126 could be or include AWS™, MICROSOFT® AZURE™, GOOGLE CLOUD SERVICES™, and/or the like.

As depicted in FIG. 1, the resource manager 104 is also communicatively coupled to the metadata storage 116, which in an embodiment is associated with data stored throughout the database platform 100. In some embodiments, the metadata storage 116 includes a summary of data stored in remote data-storage systems (such as the storage platform 118), data available in a local cache (of, e.g., the resource manager 104 and/or the execution platform 106), and/or data stored in one or more cloud platforms 126. Additionally, the metadata storage 116 may include information regarding how data is organized in remote data-storage systems, local caches, and/or one or more cloud platforms. Among other uses, the metadata storage 116 may allow systems and services to determine whether a given quantum of data needs to be processed (in connection with, e.g., a given query) without loading or accessing the actual data from a storage device, cache, cloud platform, or the like. In various embodiments, metadata that reflects the contents of a database, a table, a column, a materialized view, and/or one or more other collections of records or parts of records may be referred to herein at times as expression properties.

The resource manager 104 is further coupled to the execution platform 106, which may provide multiple computing resources (e.g., execution nodes) that execute various data-storage and/or data-retrieval tasks. In at least one embodiment, the resource manager 104 includes a layer of code (e.g., Java code) that is global with respect to the database platform 100, where that code layer includes instructions for performing functions such as compiling queries and brokering requests to one or more execution nodes in the execution platform 106. In some embodiments, there exists one or more instances of the execution platform 106 used for executing client tasks, such as database queries and/or internal database tasks such as updating metadata, clustering (or reclustering) tables, generating materialized views, and the like. In some such embodiments, there also exists one or more instances of the execution platform 106 used for feature development and/or testing, and each such instance of the execution platform 106 may be separate from each client instance of the execution platform 106, such that, for example, customer-job processing is not impacted by feature-development tasks. Other arrangements are possible as well.

The execution platform 106 may be coupled to multiple data-storage devices such as one or more of a data-storage device 120, a data-storage device 122, and a data-storage device 124 that are part of the example storage platform 118. Although three data-storage devices are shown in FIG. 1, the storage platform 118 may include—and the execution platform 106 may be capable of communicating with—any number of data-storage devices. In some embodiments, one or more of the data-storage device 120, the data-storage device 122, and the data-storage device 124 are cloud-based storage devices located in one or more geographic locations. For example, one or more of the data-storage device 120, the data-storage device 122, and the data-storage device 124 may be part of a public cloud infrastructure or a private cloud infrastructure. One or more of the data-storage device 120, the data-storage device 122, and the data-storage device 124 may be or include hard disk drives (HDDs), solid state drives (SSDs), storage clusters and/or any other data-storage technology. In some examples, the storage platform 118 includes distributed file systems (such as Hadoop Distributed File Systems (HDFSs)), object storage systems, and/or the like.

As shown in FIG. 1, the storage platform 118—including the data-storage device 120, the data-storage device 122, and the data-storage device 124—is decoupled from the computing resources associated with the execution platform 106, the resource manager 104, and the database manager 102 generally. In an embodiment, each of a plurality of database-platform deployments includes a respective storage platform 118 having its own respective one or more data-storage devices. This architecture supports dynamic changes to the database platform 100 based on changing data-storage and/or data-retrieval needs, as well as changing needs of users and systems accessing the database platform 100. The support of dynamic changes allows the database platform 100 to scale quickly in response to changing demands on the systems and components within the database platform 100. The decoupling of the computing resources from the data-storage devices supports the storage of large amounts of data without requiring a corresponding large amount of computing resources. Similarly, this decoupling supports a significant increase in the computing resources utilized at a particular time without requiring a corresponding increase in data-storage resources.

As a general matter, in at least some embodiments, the database platform 100 can be referred to using terms such as a cloud-based data warehouse, a network-based data warehouse, or simply a data warehouse. A cloud-based data warehouse is one type of network-based data system that can be used for data analysis and reporting and that includes a central repository of integrated data from one or more disparate sources. A cloud-based data warehouse is commonly an OLAP database that can store current and historical data that can be used for creating analytical reports for an enterprise based on data stored within databases of the enterprise. To this end, data warehouses often provide business-intelligence tools, tools to extract, transform, and load data into the repository, and tools to manage and retrieve metadata, among other examples. There are other types of cloud-based data warehouses, such as OLTP databases, as well as data systems that operate with characteristics of multiple types of database systems.

Any one or more of the components, devices, systems, and/or the like that are depicted in FIG. 1 and in any of the other figures could be implemented as one or more computing devices having an architecture that is similar to the example computing device 300 that is described below in connection with FIG. 3. Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations). Moreover, in particular embodiments, any one or more of the communication links depicted in FIG. 1 and in any of the other figures could be implemented via one or more data-communication networks, which may utilize any communication protocol and any type of communication medium. In some embodiments, the data-communication networks are a combination of two or more data-communication networks (or sub-networks) coupled to one another. In various different embodiments, these communication links can be implemented using any type of communication medium and any communication protocol.

Figure 2:
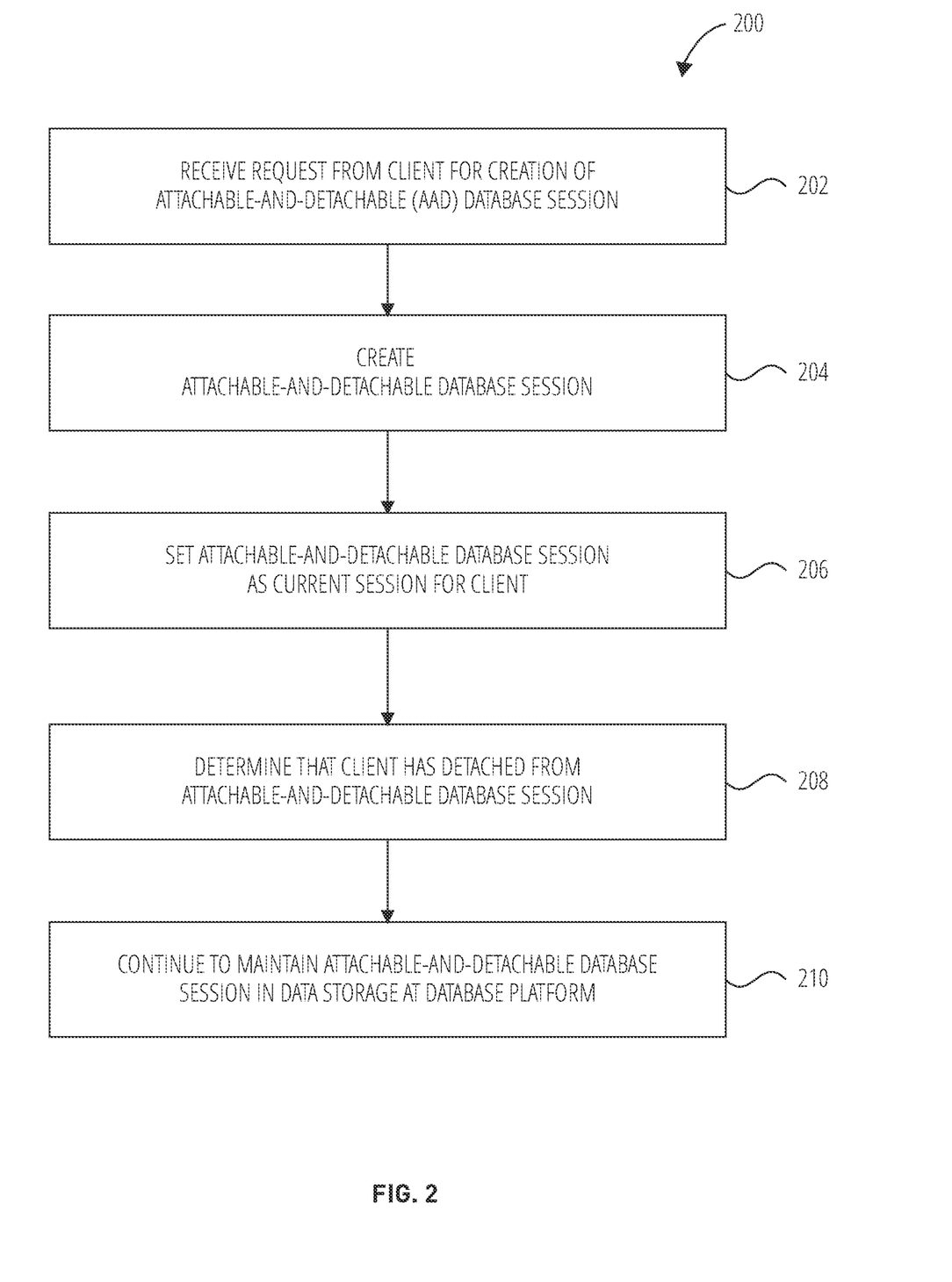
FIG. 2 illustrates an example method, in accordance with at least one embodiment.

FIG. 2 illustrates an example method 200, in accordance with at least one embodiment. In various different embodiments, the method 200 could be performed by any computing and communication device or system of such devices that is suitably equipped, programmed, and configured to perform the operations described herein in connection with the method 200. In some embodiments, all or part of the method 200 is performed by the database manager 102, which may involve one or more aspects of the method 200 being performed by the resource manager 104, one or more aspects of the method 200 being performed by the execution platform 106, and/or one or more aspects of the method 200 being performed by one or more other functional components of the database manager 102. By way of example and not limitation, the method 200 is described below as being performed by the database manager 102 of the database platform 100.

At operation 202, the database manager 102 receives a request from a client 110 for creation of an attachable-and-detachable database session. In this example, the client 110 is a JDBC driver operating in conjunction with the client-side application 114 on the client-side system 108. Prior to receiving this request at operation 202, the client 110 may have established a connection with the database platform 100, authenticated with the database platform 100, and received from the database platform 100 a session token for a conventional database session that the database platform 100 created for the client 110. This conventional database session may have a number of session parameters set by the client 110 and/or inferred or inherited from one or more other sources. The client 110 may create and/or set one or more session variables for the conventional database session. The conventional database session may be bound at the database platform 100 to the user application) that was authenticated and to the current role of that user.

The client 110 may run queries and/or issue other database-transaction commands (e.g, insert, modify, delete, etc.) prior to issuing a request to the database manager 102 to create an AAD session for the client 110. The client 110 may issue a command similar to the following to request the creation of an AAD session:

CREATE AAD SESSION sessionName where "sessionName" is a name chosen by the client 110 for the requested AAD session. In some embodiments, a role can be specified in such a command, though the database manager 102 may require that the current user has access to the specified role. In some embodiments, in no role is specified in such a command, a default (e.g., low privilege, system role) is used. It is further noted that, in some embodiments, the client 110 can use an expanded form of that command such as:

CREATE AAD SESSION sessionName CLONE CURRENT_SESSION( )

In at least one embodiment, either of the above-two commands creates a new AAD session that is a clone of the current conventional database session, with all session parameters and session variables copied into the new AAD session. In at least one embodiment, a default behavior when a session is cloned is that a change is made to the role associated with the session—for example, a role with lesser privileges than that being used by the user doing the cloning could be assigned to the cloned session.

At operation 204, responsive to receiving the above command at operation 202, the database manager 102 creates the requested AAD session for the client 110 at the database platform 100. In doing so, the database manager 102 may store a snapshot of the current conventional database session in the storage platform 118. This snapshot may reflect aspects of the conventional database session such as the current user, role, values of one or more session parameters, state of one or more session variables, and/or the like. In at least one embodiment, the database platform 100, including the storage platform 118, is structured in a distributed, resilient, fault-tolerant manner such that the stored snapshot may become available across multiple clients (e.g., multiple clients that are associated with a customer account of the client 110). The stored snapshot is not associated with only a particular server or instance.

In some instances, the client 110 may alter the stored AAD session by, e.g., issuing ALTER commands to explicitly set and/or unset one or more session parameters of the stored AAD session. Thus, the client 110 can craft the stored AAD session for reasons such as workload-based reasons, compliance reasons, and/or one or more other types of reasons. In one example, the client 110 may issue an ALTER command such as:

ALTER AAD SESSION sessionName SET QUERY_TAG='This query comes from an attachable session.'

In some embodiments, the client 110 has the option to list the AAD sessions visible to the client 110, which would typically include the AAD sessions created by the client 110 as well as any other AAD sessions to which the client 110 has been granted access. In some embodiments, an administrative user can use this command to view AAD sessions created in connection with a given database, a given account, and/or the like. The client 110 may be able to view such AAD sessions by issuing a command such as:

SHOW AAD SESSIONS

The output of this command may list, for each AAD session visible to the client 110, details such as the session name, how long it has been active, whether it is currently in use, the last time it was accessed, details about what user or what process created it, other metadata, and/or the like.

At operation 206, the database manager 102 sets the newly created AAD session ("sessionName") as the current database session for the client 110 at the database platform 100. The database manager 102 may do so in response to receiving from the client 110 a command such as:

USE SESSION sessionName

Prior to setting the AAD session sessionName as the current database session for the client 110 at the database platform 100, the database manager 102 may verify that a current context of the client 110 has access to that AAD session. The database manager 102 may do so using what is known as role-based access control (RBAC) functions. In an embodiment, a client is only permitted to attach to an AAD session if the current user or role has been granted a USAGE privilege on that AAD session, or if the current user or role has OWNERSHIP on that session. For instance, in an embodiment, a user having a given low-level role would not be permitted to attach to an AAD session that was created using a higher-privileged administrator role. In some embodiments, prior to permitting a given user to attach to a stored AAD session, the database manager 102 verifies that no other user is currently attached to that same AAD session. In other embodiments, simultaneous attachment is permitted. Such are design choices that can be made by those of skill in the relevant art having the benefit of this disclosure. Moreover, in at least one embodiment, a command such as the above "USE" command results in a log entry such that an administrator can track who used a given session—this information may be visible in the output of an information schema table or log.

While the current database session of the client 110 is set to the AAD session "sessionName," the database manager 102 may receive, from the client 110, and execute one or both of one or more queries and one or more database-transaction commands as part of the AAD session "sessionName." The database manager 102 may also maintain, in the storage platform 118, at least one session-update record reflecting the executed one or both of one or more queries and one or more database-transaction commands as part of the AAD session "sessionName," in this manner, the storing of the initial snapshot and the storing of updates results in the database manager 102 storing current state of the AAD session in the storage platform 118 so that one or more clients can attach to and resume the work of the session.

In an embodiment, the database manager 102 manages the assignment of the current database session of the client 110 by storing data that maps between (i) the current session token that the database platform 100 has assigned to the conventional database session initially created for the client 110 and (ii) an identification of the current database session for the client 110, making the experience seamless for the client 110. Thus, in at least one embodiment, even while attached to the AAD session, the client 110 still issues queries and/or other database-transaction commands having the original (or current) session token (for the conventional database session) embedded therein. The database manager 102 takes care of mapping that session token to the current AAD session.

This approach can be used across a sequence of any number of USE SESSION commands. For example, if the database platform 100 programmatically creates a "session_A" for the client 110 upon the client 110 establishing a given connection (and creates and provides to the client 110 a session token that is referred to here by way of example as "session_A_token"), the client 110 may then issue a sequence of commands such as:

```
CREATE AAD SESSION session_B
USE session_B
CREATE AAD SESSION session_C
USE session_C
```

The client 110 could then continue to send queries and/or other database-transaction commands having session_A_token embedded therein, and the database manager 102 would reference its mapping data and accordingly apply the received queries and/or other commands to the AAD session called session_C. If, as another example, session_C had previously been created and was visible to the client 110, the second-to-last of the above-listed four commands could be omitted and the same result would occur. To continue this example, the client 110 may then issue a command such as this:

LEAVE session_C

Any queries and/or other database-transaction commands that were then received would be applied in this example embodiment by the database manager 102 to session_B, as the database manager 102 would have set the current database session of the client 110 to session_B. The client 110 may then issue this leave command:

LEAVE session_B

The database manager 102 may then apply any received queries and/or other database-transaction commands to the original conventional database session session_A after having set the current database session of the client 110 to session A. Other implementations are possible: for example, the "LEAVE session_C" command could, in some embodiments, result in the current database session for the client 110 being changed from session_C directly to session_A. In other embodiments, the database manager 102 may explicitly issue session-specific tokens to clients each time the clients change their current database session. Other implementations are possible as well. It is further noted that, if, for example, a second client established a connection and had a conventional database session established for then, and then attached to session_B, attached to session_C, then left session_C and then left session_B, that second client would revert to their own conventional database session rather than to session_A, which in this example is bound to the client 110.

In an embodiment, each time a query or other database-transaction command is received by the database manager 102 in connection with an AAD session, the database manager 102 verifies that the underlying conventional database session continues to have proper RBAC access to the given AAD session. The database manager 102 may also check whether the given AAD session still exists. A given AAD session can be removed from the database platform 100 in at least one embodiment by a client (having proper RBAC privileges) issuing a drop command such as:

DROP sessionName

In at least one embodiment a drop command such as that is the sole way that an AAD session can be removed from the database platform 100 (other than, in some embodiments, by an administrator). That is, in some embodiments, AAD sessions do not expire on their own.

Assuming that the given AAD session still exists, the database manager 102 may keep an audit trail of queries and/or other database-transaction commands executed on the AAD session, as well as recording (in, e.g., a session log) events such as the creation of the AAD session, the dropping of the AAD session, use commands, leave commands, and/or the like, including tracking which users issues which commands. In at least one such embodiment, the audit trail shows queries and other commands executed during an AAD session as having been run by the user and role defined in the AAD session, and audit-trail entries may additionally include data that indicates the initial conventional database session from which the user attached (or spring-boarded) to the given AAD session. Such data can assist session auditors in reliably tracking which users have attached to the AAD session, which can be helpful in the event of an unauthorized access of an AAD session. Thus, in at least one embodiment, queries and/or other database-transaction commands that are executed in an AAD session are effectively executed within the context of the initial underlying conventional database session that was established by the database platform 100 on behalf of the given client upon that client establishing an associated connection with the database platform 100.

At operation 208, the database manager 102 determines that the client 110 has detached from the attachable-and-detachable database session. This example returns to the example in which the client 110 created and attached to an AAD session called "sessionName" using the following two commands:

```
CREATE AAD SESSION sessionName
USE SESSION sessionName
```

The database manager 102 may determine that the client 110 has detached from the AAD session called "sessionName" when the database manager 102 receives, from the client 110, a command such as the following:

LEAVE sessionName

In other instances, the database manager 102 may determine that the client 110 has detached from the AAD session called "sessionName" since the last communication was received by the database manager 102 from the client 110 in connection with that AAD session. The client 110 may unexpectedly lose connection with the database platform 100, in which case the AAD session is maintained. Upon establishing a new connection and new conventional database session with the database platform 100, the client could run the USE SESSION command as an attachment request and, upon the database manager 102 granting that attachment request, resume where they left off, issuing queries and/or other database-transaction commands.

At operation 210, after having determined at operation 208 that the client 110 has detached from the attachable-and-detachable database session, the database manager 102 continues to maintain the attachable-and-detachable database session in data storage at the database platform 100. Thus, even after receiving the above LEAVE command, the database manager 102 continues to maintain the AAD session called "sessionName" in the persistent storage of the storage platform 118.

In some instances, a client may clone an AAD session and use that session context, as opposed to attaching to an existing AAD session. This may be done because the client wishes to debug something that another client is experiencing with respect to the session, or the client may want to perform some actions that could potentially leave the session state in flux. The client may have one or more other reasons instead or in addition. To clone an AAD session, a client may issue a command such as:

CREATE AAD SESSION sessionClone CLONE session-Name where "sessionClone" is an arbitrarily selected name for the clone of the AAD session called "sessionName." To change their context to the newly created clone, a client could issue a command such as:

USE sessionClone

As referenced above, at least one embodiment of the present disclosure supports multiple different clients attaching to AAD sessions at the same or different times. An example is described here in which two different clients attach to a given AAD session at different times. In this example, the clients are two different and successive invocations of a given AWS LAMBDA™ function referred to here as "Lambda_1" and "Lambda_2" as example clients. The example starts with the client-side application 114 invoking Lambda_1, which results in the creation at the database platform 100 of a conventional database session referred to here as "session_A." As a connected client, Lambda_1 checks for the existence of an AAD session visible to it by issuing a command such as:

SHOW AAD SESSIONS

In this scenario, there are no AAD sessions visible to Lambda_1, which accordingly creates and attaches to a new AAD session with commands such as:

CREATE AAD SESSION session_B
USE session_B

Lambda 1 may then issue queries and/or other database-transaction commands as part of conducting the AAD session "session_B." In this example, Lambda 1 then reaches its execution-time limit (e.g., 15 minutes) and is terminated on the cloud platform 126 on which it was executing. The client-side application 114 may then invoke (a.k.a. "spin up") Lambda_2, which similarly runs:

SHOW AAD SESSIONS

Unlike when this command was run by Lambda_1, however, this time the AAD session "session_B" is listed. Lambda_2 accordingly runs:

USE session_B to attach to that AAD session that had been created but not completed by Lambda_1. In this hypothetical example, Lambda_2 finishes its assigned work (involving the database manager 102 receiving and executing one or both of one or more queries and one or more database-transaction commands from Lambda 2) prior to running out of time, and accordingly runs:

LEAVE session_B
DROP session_B in order to first disconnect from and then delete the AAD session "session_B" now that the work of that session is done. Obviously, the result of that work persists in the storage platform 118 in the customer account associated with the client-side application 114, Lambda 1, and Lambda 2. In other embodiments, rather than using a "SHOW AAD SESSIONS" command, Lambda_2 could have the name of "session_B" provided to it by the client-side application 114, and could then just use a "USE" command to attach to that AAD session. Other implementations are possible as well.

In at least one embodiment, AAD sessions are top-level objects in their respective customer accounts, such that two AAD sessions existing at the same time in a given customer account would have to have different names. In at least one embodiment, a DROP command with respect to a particular AAD session frees up the name of that AAD session to be used by another AAD session in the same customer account.

In at least some embodiments, the presently described AAD sessions can be useful in a troubleshooting context. One such example scenario is described here. In this example scenario, a first user uses a first client to begin a conventional database session. The first user then starts running queries, setting session parameters and variables, and the like. The first user begins to experience errors that they believe are due to the current state of the conventional database session. As examples, the first user might be seeing unexpected results being returned, they might not have access to a particular database or schema to which they usually would or expected to have access, and/or the like. In response to experiencing this situation, the first user creates an AAD session based on their current conventional database session by running a command such as:

CREATE AAD SESSION problematic_session CLONE CURRENT SESSION( )

In this example scenario, the first user then grants a USAGE privilege on the newly created AAD session "problematic_session" to an administrative user or role that an administrative user can access. To do so, the first user may issue a command such as:

GRANT USAGE ON problematic_session TO USER admin_user or:

GRANT USAGE ON problematic_session TO ROLE admin_role where "admin_user" and "admin_role" are arbitrarily selected names for this example scenario.

Further to this example, the administrative user may then connect to the database platform 100, and then attach to the problematic session using a command such as:

USE problematic_session

Upon doing so, the administrative user can then see the errors that the first user was experiencing. The administrative user can then detach from that AAD session, which causes the administrative user's original conventional database session to again become their current database session. The administrative user may then run commands to try to remediate the errors that the first user was seeing. If so desired, the administrative user can reattach to the AAD session to confirm that their actions are addressing the issue. Upon successful remediation, the administrative user could then inform the first user that the issues have been resolved, and the first user could thereafter reattach to the AAD session and resume their work. Certainly other example scenarios could be described here as well.

Figure 3:
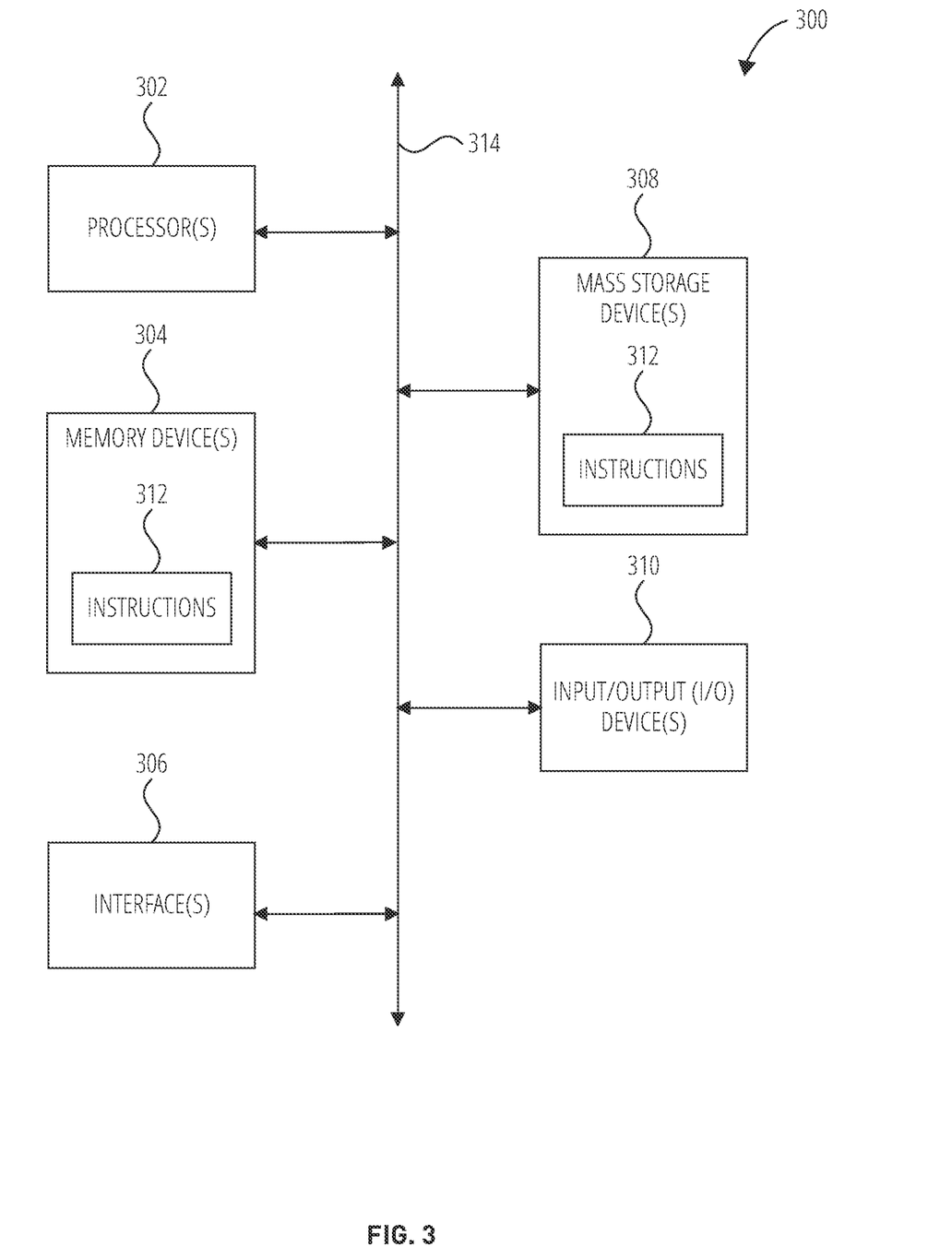
FIG. 3 illustrates an example computing device, in accordance with at least one embodiment.

FIG. 3 illustrates an example computing device 300, in accordance with at least one embodiment. In some embodiments, the computing device 300 is used to implement one or more of the systems and components discussed herein. Further, the computing device 300 may interact with any of the systems and components described herein. Accordingly, the computing device 300 may be used to perform various procedures and tasks, such as those discussed herein. The computing device 300 can function as a server, a client, or any other computing entity. The computing device 300 can be any of a wide variety of computing devices, such as a desktop computer, a notebook computer, a server computer, a handheld computer, a mobile device, a tablet, and/or the like.

In the depicted embodiment, the computing device 300 includes one or more processor(s) 302, one or more memory device(s) 304, one or more interface(s) 306, one or more mass storage device(s) 308, and one or more input/output device(s) 310, all of which are coupled to a bus 314. The processor(s) 302 includes one or more processors or controllers that execute instructions stored in the memory device(s) 304 and/or the mass storage device(s) 308.

The memory device(s) 304 can include various computer-storage media, such as volatile memory (e.g., random access memory (RAM)) and/or nonvolatile memory (e.g., read-only memory (ROM)). The memory device(s) 304 may also include rewritable ROM, such as Flash memory. The processor(s) 302 may also include various types of computer-storage media, such as cache memory.

The interface(s) 306 may include various interfaces that allow the computing device 300 to interact with other systems, devices, computing environments, and/or the like. Example interface(s) 306 include any number of different network interfaces, such as interfaces to local area networks (LANs), wide area networks (WANs), wireless networks, the Internet, and/or the like.

The mass storage device(s) 308 may include various computer-storage media, such as magnetic tapes, magnetic disks, optical disks, solid-state memory (e.g., flash memory), and so forth. Various drives may also be included in the mass storage device(s) 308 to enable reading from and/or writing to the various computer-storage media. The mass storage device(s) 308 may include removable media and/or non-removable media.

The input/output device(s) 310 may include various devices that allow data and/or other information to be input to and/or retrieved from the computing device 300. Example input/output device(s) 310 include cursor-control devices, keyboards, keypads, microphones, monitors or other display devices, speakers, printers, network interface cards (NICs), modems, lenses, charge-coupled devices (CCDs) and/or other image-capture devices, and/or the like.

The bus 314 allows the processor(s) 302, the memory device(s) 304, the interface(s) 306, the mass storage device(s) 308, and the input/output device(s) 310 to communicate with one another, as well as with other devices or components that may be coupled to the bus 314. The bus 314 represents one or more of several types of bus structures, such as a system bus, a Peripheral Component Interconnect (PCI) bus, an Institute of Electrical and Electronics Engineers (IEEE) 1394 bus, a Universal Serial Bus (USB) bus, and/or the like. In some examples, the bus 314 includes one or more network connections.

For purposes of illustration, programs and other executable program components are shown herein as discrete blocks, although it is understood that such programs and components may reside at various times in different storage components of the computing device 300 and are executed by the processor(s) 302. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

Executable Instructions and Computer-Storage Medium/Media

The memory device(s) 304, the mass storage device(s) 308, and/or one or more other memories or other data-storage components may store one or more sets of instructions 312 and data structures (e.g., software) embodying or utilized by any one or more of the methodologies or functions described herein. These instructions 312, when executed by the processor(s) 302, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM), field-programmable gate arrays (FPGAs), and Flash memory devices; magnetic disks such as internal hard disks and removable disks; magneto-optical disks; and CD-ROM and DVD-ROM disks. The terms "computer-storage medium (and media)," "machine-storage medium (and media)," and "device-storage medium (and media)" specifically exclude carrier waves, modulated data signals, and other such media, at least some of which are covered under the term "transmission medium (and media)" discussed below.

Transmission Medium/Media

In various example embodiments, any network or portion of a network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public, switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and any utilized coupling may be a Code Division Multiple Access (CDMA) connection, a Global System for Mobile communications (GSM) connection, or another type of cellular or wireless coupling. In this example, a coupling may implement any of a variety of types of data-transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, and/or other data-transfer technology.

The instructions 312 may be transmitted or received over a network using a transmission medium via a network interface device (e.g., a network interface component) and utilizing any one of a number of well-known transfer protocols (e.g., hypertext transfer protocol (HTTP)). Similarly, the instructions 312 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 312 for execution by the computing device 300, and include digital or analog communications signals or other intangible media to facilitate communication of such software. Hence, the terms "transmission medium (and media)" and "signal medium (and media)" shall be taken to include any form of modulated data signal, carrier wave, and so forth. The term "modulated data signal" means a signal that has one or more of its characteristics set or changed in such a manner as to encode information in the signal.

Computer-Readable Medium/Media

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

EXAMPLES OF EMBODIMENTS

Following is a list of some examples of embodiments.

Example 1 is a method that includes: receiving, by a database platform having at least one processor, a request from a client for creation of an attachable-and-detachable database session; creating, by the database platform responsive to receiving the request, the attachable-and-detachable database session for the client at the database platform; setting, by the database platform, the attachable-and-detachable database session as a current database session for the client at the database platform; determining, by the database platform, that the client has detached from the attachable-and-detachable database session; and maintaining, by the database platform after having determined that the client has detached from the attachable-and-detachable database session, the attachable-and-detachable database session in data storage at the database platform.

Example 2 is the method of Example 1, further including: receiving, from the client, one or both of one or more queries and one or more database-transaction commands as part of the attachable-and-detachable database session; and executing the received one or both of one or more queries and one or more database-transaction commands as part of the attachable-and-detachable database session.

Example 3 is the method of Example 2, further including maintaining, in the data storage at the database platform, at least one session-update record reflecting the executed one or both of one or more queries and one or more database-transaction commands as part of the attachable-and-detachable database session.

Example 4 is the method of either Example 2 or Example 3, further including: receiving, after having determined that the client has detached from the attachable-and-detachable database session, an attachment request from the client in connection with the attachable-and-detachable database session; and granting the attachment request from the client.

Example 5 is the method of Example 4, where the receiving and the executing of the one or both of one or more queries and one or more database-transaction commands from the client occur subsequent to the granting of the attachment request from the client.

Example 6 is the method of any of the Examples 1-5, further including: receiving, from the client, a use command with respect to the attachable-and-detachable database session, where the setting of the attachable-and-detachable database session as the current database session for the client at the database platform is performed responsive to receiving the use command.

Example 7 is the method of any of the Examples 1-6, further including receiving, from the client, a leave command with respect to the attachable-and-detachable database session, and responsively setting the current database session for the client at the database platform to be a previous database session for the client.

Example 8 is the method of Example 7, where the previous database session for the client is an initial database session created on behalf of the client upon the client establishing a connection with the database platform.

Example 9 is the method of any of the Examples 1-8, further including: receiving, after having determined that the client has detached from the attachable-and-detachable database session, an attachment request from a second client in connection with the attachable-and-detachable database session; granting the attachment request from the second client; and receiving and executing one or both of one or more queries and one or more database-transaction commands from the second client in connection with the attachable-and-detachable database session.

Example 10 is the method of any of the Examples 1-9, where: maintaining the attachable-and-detachable database session in the data storage at the database platform includes maintaining the attachable-and-detachable database session in the data storage at the database platform until receiving a drop command associated with the attachable-and-detachable database session; and the method further includes deleting the attachable-and-detachable database session from the data storage in response to receiving the drop command.

Example 11 is a database platform that includes: at least one processor; and one or more computer-storage media containing instructions executable by the at least one processor for causing the at least one processor to perform operations including: receiving a request from a client for creation of an attachable-and-detachable database session; creating, responsive to receiving the request, the attachable-and-detachable database session for the client at the database platform; setting the attachable-and-detachable database session as a current database session for the client at the database platform; determining that the client has detached from the attachable-and-detachable database session; and maintaining, after having determined that the client has detached from the attachable-and-detachable database session, the attachable-and-detachable database session in data storage at the database platform.

Example 12 is the database platform of Example 11, the operations further including: receiving, from the client, one or both of one or more queries and one or more database-transaction commands as part of the attachable-and-detachable database session; and executing the received one or both of one or more queries and one or more database-transaction commands as part of the attachable-and-detachable database session.

Example 13 is the database platform of Example 12, the operations further including maintaining, in the data storage at the database platform, at least one session-update record reflecting the executed one or both of one or more queries and one or more database-transaction commands as part of the attachable-and-detachable database session.

Example 14 is the database platform of either Example 12 or Example 13, the operations further including: receiving, after having determined that the client has detached from the attachable-and-detachable database session, an attachment request from the client in connection with the attachable-and-detachable database session; and granting the attachment request from the client.

Example 15 is the database platform of Example 14, where the receiving and the executing of the one or both of one or more queries and one or more database-transaction commands from the client occur subsequent to the granting of the attachment request from the client.

Example 16 is the database platform of any of the Examples 11-15, the operations further including: receiving, from the client, a use command with respect to the attachable-and-detachable database session, where the setting of the attachable-and-detachable database session as the current database session for the client at the database platform is performed responsive to receiving the use command.

Example 17 is the database platform of any of the Examples 11-16, the operations further including receiving, from the client, a leave command with respect to the attachable-and-detachable database session, and responsively setting the current database session for the client at the database platform to be a previous database session for the client.

Example 18 is the database platform of Example 17, where the previous database session for the client is an initial database session created on behalf of the client upon the client establishing a connection with the database platform.

Example 19 is the database platform of any of the Examples 11-18, the operations further including: receiving, after having determined that the client has detached from the attachable-and-detachable database session, an attachment request from a second client in connection with the attachable-and-detachable database session; granting the attachment request from the second client; and receiving and executing one or both of one or more queries and one or more database-transaction commands from the second client in connection with the attachable-and-detachable database session.

Example 20 is the database platform of any of the Examples 11-19, where: maintaining the attachable-and-detachable database session in the data storage at the database platform includes maintaining the attachable-and-detachable database session in the data storage at the database platform until receiving a drop command associated with the attachable-and-detachable database session; and the operations further include deleting the attachable-and-detachable database session from the data storage in response to receiving the drop command.

Example 21 is one or more computer-storage media containing instructions executable by at least one processor for causing the at least one processor to perform operations including: receiving a request from a client for creation of an attachable-and-detachable database session; creating, responsive to receiving the request, the attachable-and-detachable database session for the client at the database platform; setting the attachable-and-detachable database session as a current database session for the client at the database platform; determining that the client has detached from the attachable-and-detachable database session; and maintaining, after having determined that the client has detached from the attachable-and-detachable database session, the attachable-and-detachable database session in data storage at the database platform.

Example 22 is the one or more computer-storage media of Example 21, the operations further including: receiving, from the client, one or both of one or more queries and one or more database-transaction commands as part of the attachable-and-detachable database session; and executing the received one or both of one or more queries and one or more database-transaction commands as part of the attachable-and-detachable database session.

Example 23 is the one or more computer-storage media of Example 22, the operations further including maintaining, in the data storage at the database platform, at least one session-update record reflecting the executed one or both of one or more queries and one or more database-transaction commands as part of the attachable-and-detachable database session.

Example 24 is the one or more computer-storage media of either Example 22 or Example 23, the operations further including: receiving, after having determined that the client has detached from the attachable-and-detachable database session, an attachment request from the client in connection with the attachable-and-detachable database session; and granting the attachment request from the client.

Example 25 is the one or more computer-storage media of Example 24, where the receiving and the executing of the one or both of one or more queries and one or more database-transaction commands from the client occur subsequent to the granting of the attachment request from the client.

Example 26 is the one or more computer-storage media of any of the Examples 21-25, the operations further including: receiving, from the client, a use command with respect to the attachable-and-detachable database session, where the setting of the attachable-and-detachable database session as the current database session for the client at the database platform is performed responsive to receiving the use command.

Example 27 is the one or more computer-storage media of any of the Examples 21-26, the operations further including receiving, from the client, a leave command with respect to the attachable-and-detachable database session, and responsively setting the current database session for the client at the database platform to be a previous database session for the client.

Example 28 is the one or more computer-storage media of Example 27, where the previous database session for the client is an initial database session created on behalf of the client upon the client establishing a connection with the database platform.

Example 29 is the one or more computer-storage media of any of the Examples 21-28, the operations further including: receiving, after having determined that the client has detached from the attachable-and-detachable database session, an attachment request from a second client in connection with the attachable-and-detachable database session; granting the attachment request from the second client; and receiving and executing one or both of one or more queries and one or more database-transaction commands from the second client in connection with the attachable-and-detachable database session.

Example 30 is the one or more computer-storage media of any of the Examples 21-29, where: maintaining the attachable-and-detachable database session in the data storage at the database platform includes maintaining the attachable-and-detachable database session in the data storage at the database platform until receiving a drop command associated with the attachable-and-detachable database session; and the operations further include deleting the attachable-and-detachable database session from the data storage in response to receiving the drop command.

To promote an understanding of the principles of the present disclosure, various embodiments are illustrated in the drawings. The embodiments disclosed, herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseam in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method comprising:
   establishing a first connection between a database platform and a first account, the first account associated with a first-account user of the database platform, the database platform providing attachable-and-detachable database sessions;
   maintaining the first account and a second account on the database platform, the second account being separate and distinct from the first account;
   receiving, from a second-account user in the second account, a request to attach, to a first-account user in the first account, an attachable-and-detachable database session;
   attaching the attachable-and-detachable database session to the first-account user;
   setting the attachable-and-detachable database session as a current database session for the first-account user;
   receiving, from the first-account user, a request to detach from the attachable-and-detachable database session;
   detaching the first-account user from the attachable-and-detachable database session; and
   in response to detaching the first-account user, setting the attachable-and-detachable database session as a current database session for the second-account user, the first-account user being distinct from the second-account user.

2. The method of claim 1, further comprising:
   receiving a request to grant access to the attachable-and-detachable database session; and
   granting access to the attachable-and-detachable database session to the first-account user.

3. The method of claim 2, wherein the request to grant, to the first-account user in the first account, access to the attachable-and-detachable database session comprises a request to grant, to the first-account user in the first account, a usage privilege on the attachable-and-detachable database session.

4. The method of claim 2, further comprising receiving, from the second-account user, a request to revoke, from the first-account user, the access to the attachable-and-detachable database session, and responsively revoking, from the first-account user, the access to the attachable-and-detachable database session.

5. The method of claim 2, further comprising receiving, from the first-account user, an attachment request requesting that the first-account user attach to the attachable-and-detachable database session, wherein setting the attachable-and-detachable database session as a current database session for the first-account user is in response to the attachment request.

6. The method of claim 1, further comprising executing at least one command received from the first-account user with respect to the attachable-and-detachable database session.

7. The method of claim 1, the method further comprising: storing the attachable-and-detachable database session in the second account.

8. The method of claim 1, wherein:
   one of the first account and the second account is an administrative account of the database platform; and
   the other of the first account and the second account is a customer account of the database platform.

9. The method of claim 1, wherein:
   the first account is a first customer account of the database platform; and
   the second account is a second customer account of the database platform.

10. The method of claim 1, wherein the attachable-and-detachable database session was created in the second account.

11. The method of claim 10, wherein the attachable-and-detachable database session was created in response to a request from the second-account user.

12. The method of claim 11, further comprising:
    receiving, from the second-account user, a request to detach from the attachable-and-detachable database session; and
    based on receiving, from the second-account user, the request to detach from the attachable-and-detachable database session:
    detaching the second-account user from the attachable-and-detachable database session; and setting, as the current database session for the second-account user, a previous database session for the second-account user.

13. The method of claim 11, further comprising receiving, from the second-account user, a request to delete the attachable-and-detachable database session, and responsively deleting the attachable-and-detachable database session from the second account.

14. A database platform comprising:
    at least one processor; and
    one or more non-transitory computer readable storage media containing instructions that, when executed by the at least one processor, cause the database platform to perform operations comprising:
    establishing a first connection between a database platform and a first account, the first account associated with a first-account user of the database platform, the database platform providing attachable-and-detachable database sessions;
    maintaining the first account and a second account on the database platform, the second account being separate and distinct from the first account;
    receiving, from a second-account user in the second account, a request to attach, to a first-account user in the first account, an attachable-and-detachable database session;
    attaching the attachable-and-detachable database session to the first-account user;
    setting the attachable-and-detachable database session as a current database session for the first-account user;
    receiving, from the first-account user, a request to detach from the attachable-and-detachable database session;
    detaching the first-account user from the attachable-and-detachable database session; and
    in response to detaching the first-account user, setting the attachable-and-detachable database session as a current database session for the second-account user, the first-account user being distinct from the second-account user.

15. The database platform of claim 14, further comprising:
    receiving a request to grant access to the attachable-and-detachable database session; and
    granting access to the attachable-and-detachable database session to the first-account user.

16. The database platform of claim 15, wherein the request to grant, to the first-account user in the first account, access to the attachable-and-detachable database session comprises a request to grant, to the first-account user in the first account, a usage privilege on the attachable-and-detachable database session.

17. The database platform of claim 15, the operations further comprising receiving, from the second-account user, a request to revoke, from the first-account user, the access to the attachable-and-detachable database session, and responsively revoking, from the first-account user, the access to the attachable-and-detachable database session.

18. One or more non-transitory computer readable storage media containing instructions that, when executed by at least one hardware processor of a database platform, cause the database platform to perform operations comprising:

establishing a first connection between a database platform and a first account, the first account associated with a first-account user of the database platform, the database platform providing attachable-and-detachable database sessions;

maintaining the first account and a second account on the database platform, the second account being separate and distinct from the first account;

receiving, from a second-account user in the second account, a request to attach, to a first-account user in the first account, an attachable-and-detachable database session;

attaching the attachable-and-detachable database session to the first-account user;

setting the attachable-and-detachable database session as a current database session for the first-account user;

receiving, from the first-account user, a request to detach from the attachable-and-detachable database session;

detaching the first-account user from the attachable-and-detachable database session; and in response to detaching the first-account user, setting the attachable-and-detachable database session as a current database session for the second-account user, the first-account user being distinct from the second-account user.

19. The one or more non-transitory computer readable storage media of claim 18, further comprising:

receiving a request to grant access to the attachable-and-detachable database session; and granting access to the attachable-and-detachable database session to the first-account user.

20. The one or more non-transitory computer readable storage media of claim 19, wherein the request to grant, to the first-account user in the first account, access to the attachable-and-detachable database session comprises a request to grant, to the first-account user in the first account, a usage privilege on the attachable-and-detachable database session.

* * * * *